(12) United States Patent
Doppler et al.

(10) Patent No.: US 8,320,284 B2
(45) Date of Patent: Nov. 27, 2012

(54) APPARATUS AND METHOD FOR CHANNEL RECIPROCITY IN A WIRELESS NETWORK

(75) Inventors: Klaus Doppler, Espoo (FI); Carl Simon Wijting, Helsinki (FI); Jean-Philippe Kermoal, Copenhagen (DK); Massimo Bertinelli, Leiden (NL)

(73) Assignee: Nokia Corporation, Espoo (FI)

( * ) Notice: Subject to any disclaimer, the term of this patent is extended or adjusted under 35 U.S.C. 154(b) by 56 days.

(21) Appl. No.: 12/599,169

(22) PCT Filed: May 5, 2008

(86) PCT No.: PCT/IB2008/001096
§ 371 (c)(1),
(2), (4) Date: Dec. 17, 2010

(87) PCT Pub. No.: WO2008/135842
PCT Pub. Date: Nov. 13, 2008

(65) Prior Publication Data
US 2011/0116432 A1 May 19, 2011

Related U.S. Application Data

(60) Provisional application No. 60/916,542, filed on May 7, 2007.

(51) Int. Cl.
*H04B 7/14* (2006.01)
(52) U.S. Cl. .......................................... 370/279
(58) Field of Classification Search .................. None
See application file for complete search history.

(56) References Cited

U.S. PATENT DOCUMENTS

| | | | |
|---|---|---|---|
| 2004/0266339 A1* | 12/2004 | Larsson | 455/7 |
| 2006/0199531 A1* | 9/2006 | Williamson et al. | 455/11.1 |
| 2007/0010196 A1* | 1/2007 | Periyalwar et al. | 455/7 |
| 2007/0121531 A1* | 5/2007 | Lee et al. | 370/280 |

* cited by examiner

*Primary Examiner* — Raj Jain
(74) *Attorney, Agent, or Firm* — Squire Sanders (US) LLP (57) ABSTRACT

Disclosed herein is a method comprising using a first frequency for communication in a first direction with an infrastructure node and a second frequency for communication in a second direction with the infrastructure node during a normal operation phase in a wireless network. The method may further comprise reversing the frequencies used for the communication in the first and second directions with the infrastructure node during a link reversal phase.

17 Claims, 9 Drawing Sheets

FIG 9B

APPARATUS AND METHOD FOR CHANNEL RECIPROCITY IN A WIRELESS NETWORK

PRIORITY CLAIM

This Application claims the benefit of priority of U.S. Provisional Patent Application No. 60/916,542, filed May 7, 2007, entitled "Method And Apparatus For Channel Reciprocity In A Wireless Network," the disclosure, which is hereby incorporated by reference.

TECHNICAL FIELD

This description relates to wireless networks.

BACKGROUND

Nodes within wireless networks may communicate with each other using one or more wireless channels. Adaptive techniques are sometimes employed to allow a wireless node to adapt or modify certain transmission parameters based on changing channel conditions. Limited channel state information, or a channel quality indicator, such as a Signal to Interference and Noise ratio or SINR or other indicator, may sometimes be measured at the receiving node and provided to the transmitting node to allow the transmitting node to vary one or more parameters. In some cases, however, more detailed channel state information may be useful to allow the node to perform precoding or pre-equalization or other processing or functions relating to data transmission. Each channel may include a (e.g., time-varying) frequency response or channel response, which may indicate the manner in which signals may be distorted or modified during transmission via the channel. This may include, for example, signal attenuation and/or phase changes for one or more frequencies within the channel. These amplitude and phase distortions may be different for different frequencies and may change over time.

Precoding or pre-equalization may involve, for example, coding or modifying data prior to transmission to compensate at the transmitter for the frequency-dependent fading or channel distortion during transmission, e.g., such that the data may arrive at the receiver in an undistorted or less distorted form, for example. Other examples of precoding techniques at the transmitter modify the data prior to transmission to send data streams to multiple nodes without or with reduced interference between the data streams. Other types of processing may be performed at a transmitter as well, as precoding or pre-equalizaiton is merely one example.

A channel quality indicator, such as a SINR value, provides valuable information. In some cases, it may be useful to obtain more detailed channel state information. Therefore, techniques are desirable to allow wireless nodes to obtain channel state information in wireless networks.

SUMMARY

According to one general aspect, a method may include using a first frequency for communication in a first direction with an infrastructure node and a second frequency for communication in a second direction with the infrastructure node during a normal operation phase in a wireless network. The method may further include reversing the frequencies used for the communication in the first and second directions with the infrastructure node during a link reversal phase. For example, the communication in the first and second directions (e.g., uplink and downlink directions) may be provided between two (or more) infrastructure nodes, such as between an access gateway/base station/access point and a relay node or between two relay nodes, in some example embodiments.

According to another general aspect, a method may include using a first frequency for uplink communication to an infrastructure node and a second frequency for downlink communication from the infrastructure node in a wireless network during a first time slot of a normal operation phase. The method may also include using the second frequency for downlink communication to a user terminal and the first frequency for uplink communication from the user terminal during a second time slot of a normal operation phase. The method may also include reversing the frequencies used for the uplink and downlink communication with the infrastructure node during a link reversal phase.

According to another general aspect, a method may include transmitting to an infrastructure node using a first frequency during a first normal operation phase. The method may also include receiving from the infrastructure node using the first frequency during a link reversal phase and obtaining channel state information based on received data which were received using the first frequency during the link reversal phase. The method may also include precoding transmitting data based on the channel state information, and transmitting the precoded transmitting data to the infrastructure node using the first frequency during a second normal operation phase.

For example, a method may include an access gateway (or base station or access point) receiving signals from a relay node using a first frequency during a first phase (or a link reversal phase). The access gateway may obtain or determine channel state information and/or determine a channel response for a wireless channel associated with the first frequency (e.g., for the channel between the access gateway and the relay node using the first frequency) based on the signals received at the access gateway from the relay node during the first phase. The method may also include the access gateway transmitting signals to the relay node using the first frequency during a second phase (or normal operation phase). The method may also include the access gateway precoding data for transmission to the relay node based on the determined channel state information and/or channel response for the channel associated with the first frequency, and transmitting the precoded data to the relay node using the first frequency during a second phase or normal operation phase.

As another example, a method may include a first relay node receiving signals from a second relay node using a first frequency during a first phase (or a link reversal phase). The first relay node may obtain or determine channel state information and/or determine a channel response for a wireless channel associated with the first frequency (e.g., for the channel between the first and second relay nodes using the first frequency) based on the signals received at the first relay node from the second relay node during the first phase. The method may also include the first relay node transmitting signals to the second relay node using the first frequency during a second phase (or normal operation phase). The method may also include the first relay node precoding data for transmission to the second relay node based on the determined channel state information and/or channel response for the channel associated with the first frequency, and transmitting the precoded data to the second relay node using the first frequency during a second phase or normal operation phase.

According to another general aspect, a method may include transmitting to an infrastructure node using a first frequency during a first normal operation phase. The method may also include receiving from the infrastructure node using the first frequency during a link reversal phase and determining a frequency response of the first frequency based on received data which were received using the first frequency during the link reversal phase. The method may also include precoding transmitting data based on the frequency response, and transmitting the precoded transmitting data to the infrastructure node using the first frequency during a second normal operation phase.

According to another general aspect, an apparatus may be configured to use a first frequency for communication in a first direction with an infrastructure node and a second frequency for communication in a second direction with the infrastructure node during a normal operation phase in a wireless network. The apparatus may be further configured to reverse the frequencies used for the communication in the first and second directions with the infrastructure node during a link reversal phase.

According to another general aspect, an apparatus may include a transceiver, a controller, and a memory. The transceiver may be configured to use a first frequency for communication in a first direction with an infrastructure node and a second frequency for communication in a second direction with the infrastructure node during a normal operation phase in a wireless network, and to reverse the frequencies used for the communication in the first and second directions with the infrastructure node during a link reversal phase. The controller may be configured to determine a frequency response of a wireless channel associated with the first frequency based on a signal received during the link reversal phase, precode data based on the frequency response, and instruct the transceiver to transmit the precoded data in the first direction using the first frequency. The memory may be configured to store the frequency response.

The details of one or more implementations are set forth in the accompanying drawings and the description below. Other features will be apparent from the description and drawings, and from the claims.

DETAILED DESCRIPTION

Figure 1A:
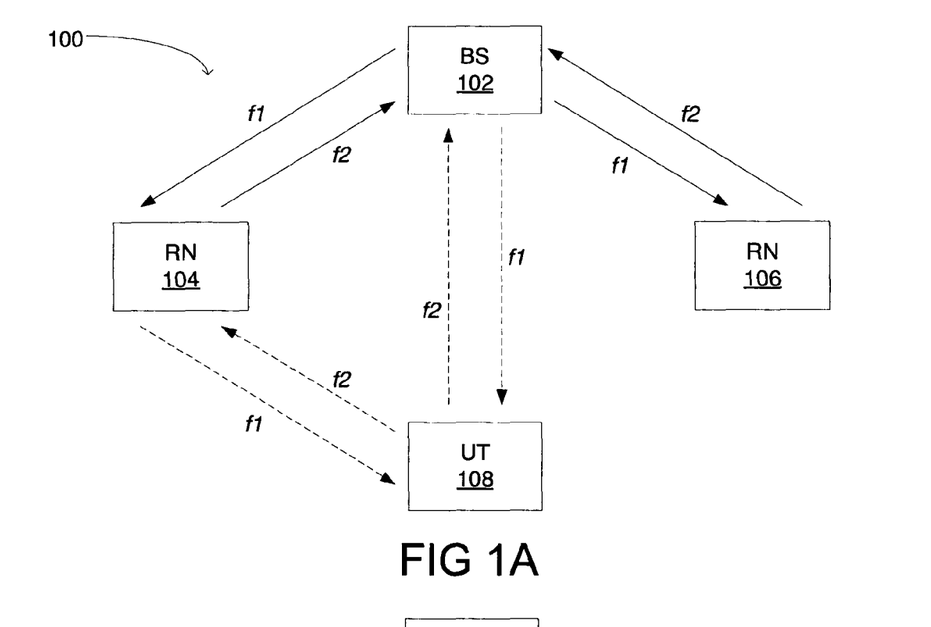
FIG. 1A is a diagram of a wireless network in a normal operation phase according to an example embodiment.

FIG. 1A is a diagram of a wireless network 100 in a normal operation phase according to an example embodiment. The wireless network 100, which may include, for example, a mesh network or relay enhanced cell, may include a number of infrastructure nodes, such as one or more base stations 102 (which may also include access points, access gateways, or node B's), and one or more relay nodes 104, 106. The relay nodes 104, 106 may forward data between the base station 102 and a user terminal 108, and may extend the coverage area of a cell such as the wireless network 100, or extend the capacity at the cell edge. The relay nodes 104, 106 may be either fixed or mobile; the wireless network 100 may include multi-hop relay connections between the base station 102 and the user terminal 108, according to an example embodiment. Although not shown, any or all of the infrastructure nodes 102, 104, 106 may be coupled to a fixed network, such as a Local Area Network (LAN), Wide Area Network (WAN), the Internet, etc., and may also be coupled to other wireless networks. Although, more commonly, base station (BS) 102 may be coupled to a fixed or wired network. In one example embodiment, a user terminal may also act as a relay node.

The wireless network 100 may include one or more user terminals (UT) 108, such as wireless personal digital assistants, cell phones, wireless local area network (WLAN) phones, or other wireless devices. These are merely a few examples and the description is not limited thereto.

The infrastructure nodes 102, 104, 106 may be in communication with each other, and may be in communication with the user terminal 108. According to an example embodiment, the base station 102 may communicate or transmit to one or more of the relay nodes 104, 106 in a first direction or downlink direction shown by the arrows, and the relay node 104 may communicate or transmit to the user terminal 108 in the first or downlink direction. According to this example embodiment, the user terminal 108 may communicate or transmit to the relay node 104 in a second or uplink direction shown by the arrows, and the one or more relay nodes 104, 106 may communicate or transmit to the base station 102 in the second or uplink direction.

The various embodiments described herein may be applicable to a wide variety of networks and technologies, such as WLAN networks (e.g., IEEE 802.11 type networks), IEEE 802.16 WiMAX networks, cellular networks (e.g. GSM, 3GPP UMTS, 3GPP LTE), relay networks or relay enhanced cells, radio networks, or other wireless networks. They may, for example, be applied to the IST-WINNER project, which may develop flexible and scalable radio interfaces covering different domains, such as local area, metropolitan area, and wide area, with the same radio interface. The various examples and embodiments may be applied, for example, to a mesh wireless network, where a plurality of mesh points (e.g., access points or wireless node) may be coupled together via wired or wireless links. The various embodiments described herein may be applied to wireless networks, both in an infrastructure mode where an infrastructure node such as the base station 102 communicates with wireless nodes in the network 100 such as the relay nodes 104, 106 or the user terminal 108 (i.e., communication occurs through the base station 102), as well as in an ad hoc mode in which any of the wireless nodes in the network, such as the base station 102, relay node 104, 106, or user terminal 108, may communicate directly via a peer-to-peer network, for example.

In an example embodiment, the wireless nodes 102, 104, 106, 108 in the wireless network 100 may operate in a frequency division duplex (FDD) mode. For example, the nodes may use a first frequency (denoted f1 in FIG. 1A) for communication in a first direction, such as the downlink direction, and may use a second frequency (denoted f2 in FIG. 1B) for communication in a second direction, such as the uplink direction. The term, "frequency," may generally include, by way of example, a carrier (or subcarrier) frequency which has been modulated to include data, a group of frequencies (or sub-frequencies) such as a group of subcarriers in a modulation scheme such as orthogonal frequency division multiplexing (OFDM), or a frequency band or spectral region which may include a range of frequencies along which data may be transmitted. The term frequency may also refer to a center frequency of a wireless channel, or the center frequency, for example, of a subcarrier, or a frequency within a channel.

According to the example shown in FIG. 1A, during a normal operation phase, the base station 102 may use the first frequency f1 for downlink communication with the relay nodes 104, 106 and/or the user terminal 108, and the relay node 104 may use the first frequency f1 for downlink communication with the user terminal 108. Also according to this example, the user terminal 108 may use the second frequency f2 for uplink communication with the base station 102 and/or the relay node 104 and the relay nodes 104, 106 may use the second frequency f2 for uplink communication with the base station 102. Thus, in this example embodiment shown in FIG. 1A, communication in the downlink direction may be provide via a channel or channels associated with frequency f1, while communication in the uplink direction may be performed or provided via a channel or channels associated with frequency f2. This is merely an example, and the description is not limited thereto.

Figure 1B:
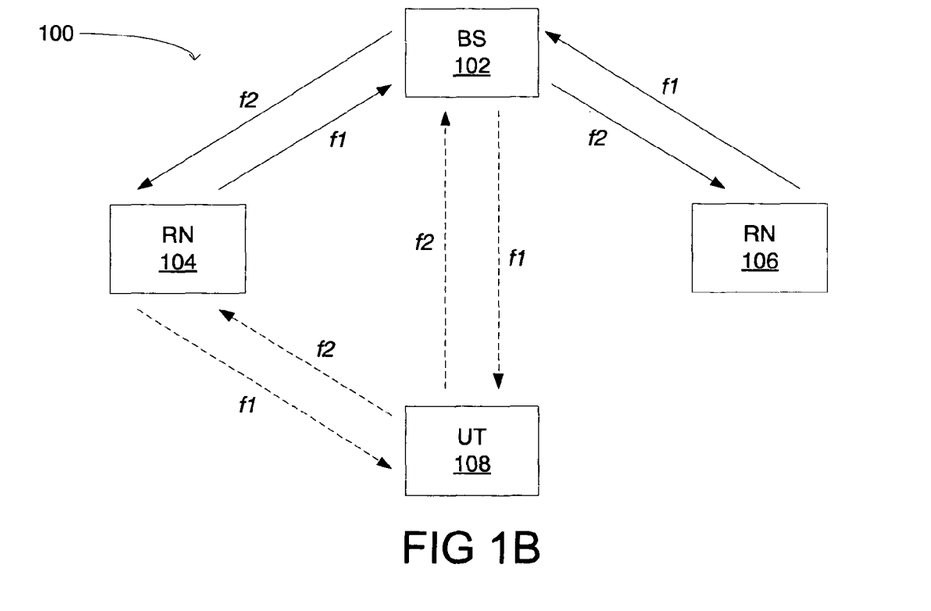
FIG. 1B is a diagram of the wireless network in a link reversal phase according to an example embodiment.

FIG. 1B is a diagram of the wireless network 100 in a link reversal phase according to an example embodiment. According to this example, the frequencies used for communication in the first and second directions between the infrastructure nodes 102, 104, 106 may reverse. The infrastructure nodes 102, 104, 106 may enter the link reversal phase in response to, for example, a signal from one of the other infrastructure nodes 102, 104, 106. For example, the base station 102 may send a request to perform a link reversal phase, the relay nodes 104, 106 may receive the request, and the relay nodes 104, 106 and/or the base station 102 may schedule the link reversal phase based on the request. Or, one of the relay nodes 104, 106 may send a message to the other infrastructure nodes 102, 104, 106 indicating a schedule for the link reversal phase, and the infrastructure nodes 102, 104, 106 may perform the link reversal phase at one or more scheduled times based on the schedule. Or the base station 102, may send out a message to all the infrastructure nodes (e.g., 104, 106) in the network indicating the scheduled time(s) for link reversal phase. For example, link reversal phase may be used or provided every other time slot. Other techniques may be used as well.

According to an example embodiment, the frequencies or channels used for communication between each infrastructure nodes and the user terminals (such as user terminal 108) are typically not reversed, but remain the same as in normal operation. Thus, the communication with the user terminals in FIGS. 1A and 1B is shown with dashed lines (e.g., since reversing of channels or frequencies is not necessarily employed for user terminals during link reversal phase). In an example embodiment, the user terminals (e.g., UT 108) may cease communication or cease transmitting during the link reversal phase, and the various infrastructure nodes typically do not communicate to user terminals during the link reversal phase. Thus, in an example embodiment, the link reversal phase may be used by the infrastructure nodes to obtain more detailed channel state information based on a temporary reversing or switching of the transmission channels or frequencies used by infrastructure nodes (as compared to the channels or transmission frequencies used by infrastructure nodes during normal operation phase). However, in an alternative example embodiment, the channels or frequencies may be reversed for communication between infrastructure nodes (e.g., RNs, BSs) and user terminals in the link reversal phase.

During the link reversal phase (example shown in FIG. 1B), the frequencies used for communication in the first and second (e.g., downlink and uplink) directions are reversed for the communication between the infrastructure nodes (or at least between some of the infrastructure nodes), as compared to the directions and frequencies used during a normal operation phase (e.g., FIG. 1A).

For example, referring to the example of FIG. 1B, during the link reversal phase, the base station 102 may use the second frequency f2 for communication in the first or downlink direction with the relay nodes 104, 106, and the relay nodes 104, 106 may use the first frequency f1 for communication in the second or uplink direction with the base station 102.

According to one example, the base station 102 may receive signals from the relay nodes 104, 106 via the first frequency f1 during the link reversal phase. The signals received may include a pilot frame or training sequence with predetermined values; deviation by the received signal from the predetermined values may be caused by, for example, multipath fading or other channel distortion. Based on these received signals, the base station 102 may determine a channel response or frequency response or channel state information of a wireless channel associated with the first frequency f1. Base station may similarly determine the channel response or frequency response of other channels or other subcarriers based on signals received at the base station 102 during the link reversal phase. By reversing the channels or frequencies used for communication between infrastructure nodes during a link reversal phase, this may provide the infrastructure node with more detailed channel state information for the channel or frequency used by the infrastructure node for transmission during normal operation phase. The base station or relay node may determine the current channel response or frequency response for the channel based on signals or tones received during link reversal phase.

Once the base station 102 returns to the normal operation phase, the base station 102 may perform precoding (or pre-equalization) on data based on the determined frequency response or channel state information, and transmit the precoded data to the relay nodes 104, 106 via the first frequency f1. This precoding may be performed, for example, to at least partially compensate at a wireless transmitter for the signal distortion or changes that may occur due to the wireless channel. By obtaining more detailed channel state information via the link reversal phase, this may allow for more effective precoding, higher throughput and/or data rates because of a more efficient precoding with lower signaling overhead because the channel state information does not have to be transmitted, for example.

Similarly, the relay nodes 104, 106 may receive signals from the base station 102 via the second frequency f2 during the link reversal phase. Based on these received signals, the relay nodes 104, 106 may determine a frequency response or channel state information of a wireless channel associated with the second frequency f2. Once the relay nodes 104, 106 return to the normal operation phase, the relay nodes 104, 106 may perform precoding on data based on the determined frequency response or channel state information, and transmit the precoded data to the base station 102 via the second frequency f2.

According to one example, the user terminal 108 may communicate using the same frequencies during the link reversal phase as during the normal operation phase. According to this example, the base station 102 and/or relay node 104 may use the first frequency f1 to communicate with the user terminal 108 in the first or downlink direction, and the user terminal 108 may use the second frequency f2 to communicate with the base station 102 and/or relay node 104 in the second or uplink frequency.

According to another example, the user terminal 108 may not communicate with any of the infrastructure nodes 102, 104, 106 during the link reversal phase. According to this example, the user terminal 108 does not typically send or receive any uplink or downlink communications during the link reversal phase.

Another example embodiment may involve reversing the direction of only one frequency. For example, the first frequency f1 may reverse direction from the first or downlink direction to the second or uplink direction during the link reversal phase. In this example, an infrastructure node such as the base station 102 may transmit to another infrastructure node such as relay node 104 using the first frequency f1 during a first normal operation phase. During the link reversal phase, the base station 102 may receive from the relay node 104 using the first frequency f1 during the link reversal phase. During the link reversal phase, the base station 102 may obtain or determine a frequency response or channel response or channel state information based on received data which may be received using the first frequency during the link reversal phase. The base station 102 may precode data based on the frequency response or channel state information, and may then transmit the precoded transmitting data to the relay node 104 using the first frequency f1 during a second normal operation phase. In alternative embodiments, the base station 102 and relay node 104 may be reversed, or the second frequency f2 may be used instead of the first frequency f1.

Thus, in an example embodiment, the channel characteristics or channel state information may be very similar or even the same for a frequency or channel, regardless of whether it is for downlink or uplink transmission. Thus, channel state information obtained based on signals received by a node during a link reversal phase for a channel associated with frequency f1 may be used to perform data precoding (or other processing) for transmission over the channel associated with frequency f1 during a subsequent normal operation phase. The link reversal phase may, therefore, allow a node (e.g., infrastructure node) to obtain more detailed channel state information for a channel by reversing the channels or frequencies during a link reversal phase. This channel state information may be used to perform precoding or other data processing by the node during the normal operation phase.

Figure 2:
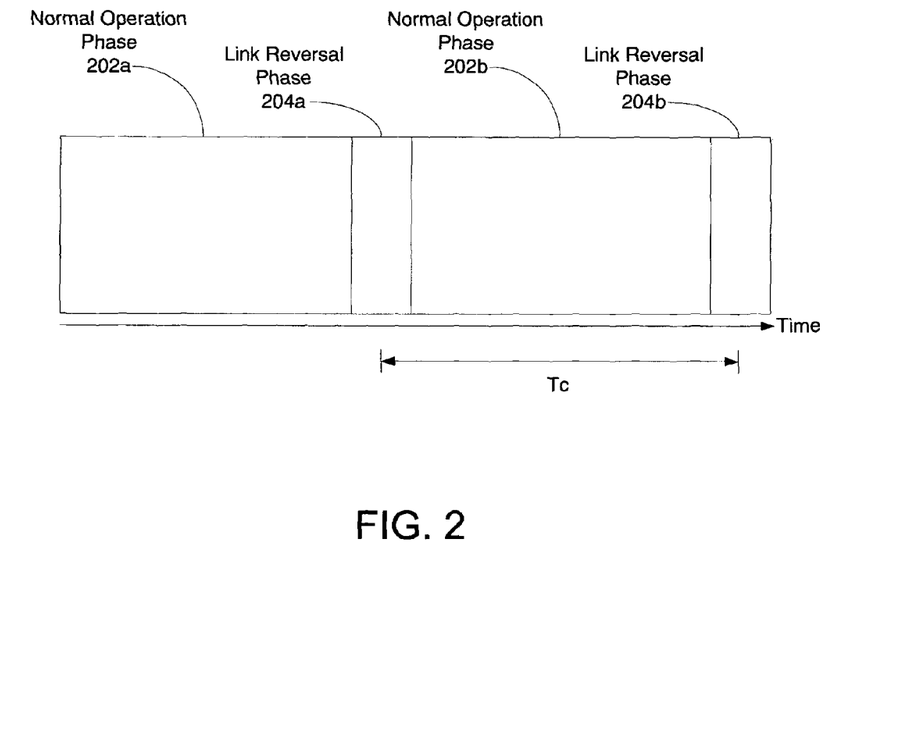
FIG. 2 is a timing diagram showing the normal operation phase and the link reversal phase according to an example embodiment.

FIG. 2 is a timing diagram showing the normal operation phase 202 and the link reversal phase 204 according to an example embodiment. According to this example, the normal operation phase 202 may alternate in time with the link reversal phase 204. Thus, a first normal operation phase 202a may be followed by a first link reversal phase 204a, which may be followed by a second normal operation phase 202b, which may be followed by a second link reversal phase 204b. The duration of the link reversal phase 204 may be shorter than the duration of the normal operation phase 202. The link reversal phase 204 may begin and/or end at times scheduled according to a request communicated by one of the infrastructure nodes 102, 104, 106.

According to an example embodiment, the link reversal phase 204 may have a shorter duration than the normal operation phase 202. According to this example, the link reversal phase 204 may be used for obtaining channel state information such as information that may be used to determine a frequency response or channel response for the channel. The normal operation phase 202 may be used for normal operation or normal transmission of data. The link reversal phases 204 may be relatively short (as compared to the length of the normal operation phases), and may be scheduled at times that may allow nodes to obtain updated channel state information. Thus, link reversal phases may be scheduled or performed at time intervals that may provide updated channel state information to an infrastructure node based on a changing channel state. Also, link reversal phases may be scheduled to occur periodically, or may be requested by a node, e.g., as the node detects a change in a channel state that exceeds a threshold, etc. As channels used in a network may be similar (not too distant) in frequency, a significant change in the state of one channel may provide an indication that the state of other wireless channels may also have changed state, and thus, there may likely be a need to obtain updated channel state information via a link reversal phase. This may allow a node to maintain more accurate channel state information, which may allow more accurate precoding or pre-equalization, for example.

According to an example embodiment, the normal operation phase 202 may have a duration equal to or less than a coherence time, Tc, of either the first frequency f1 or the second frequency f2. Or, the sum of the durations of the normal operation phase 202 and the link reversal phase 204 may be equal to or less than the coherence time Tc. If the relay nodes 104, 106 have different coherence times Tc, then the lowest coherence time may be used, according to an example embodiment.

The coherence time Tc may be used to characterize the time varying nature of the channel in the time domain, and may be a statistical measure of the time duration over which the channel impulse response is essentially invariant. For example, the coherence time Tc may indicate a period of time over which the channel state may remain substantially constant. The base station 102 may calculate the coherence time Tc based on a feedback-channel response of pilot tones according to a number of known methods, such as an inverse of a Doppler spread, a time over which a time correlation function is above 0.5, or a geometric mean of these two methods, as non-limiting examples. By keeping the duration of the normal operation phase 202 equal to or less than the coherence time Tc, the channel response of signals transmitted during the normal operation phase 202 may remain essentially invariant (or substantially constant), and the frequency response or channel state information may be accurately determined. A coherence time Tc for the downlink channel may be estimated based on the coherence time Tc of the uplink channel, according to an example embodiment.

Thus, in an example embodiment, the link reversal phase may be performed at least every coherence time Tc for a channel, e.g., to allow a node (or nodes) to maintain updated channel state information, although other periods or intervals may be used for performing or scheduling link reversal periods. For example, if a link reversal phase is performed only every 3×Tc (or three time the coherence time for a channel), then this may cause a node to maintain in accurate channel state information beyond the Tc period for a channel, which may result in less accurate precoding or other processing.

The frequency of scheduling a link reversal phase 204 and reversing the frequencies may be determined statically, such as by reversing the last frame in every super-frame or reversing every $N_{th}$ frame, where N, for example, may depend on the minimum expected coherence time of the channel and system parameters such as the frame structure, or may be determined dynamically. For example, N may be 2 (or other number), where the switching or reversing of frequencies every other frame. Precoding may be performed in one or both directions, and in one or both phases (e.g., precoding may be used during normal operation phase and link reversal phase). Dynamic approaches may include flexible intervals controlled by one infrastructure node such as the base station 102, such as scheduling a link reversal phase 204 when the base station 102 needs fresh channel state information, or a distributed control in which each infrastructure node 102, 104, 106 may indicate a need for a link reversal phase 204 to the other nodes. Or, a fixed reversal pattern (or fixed link reversal schedule) may be established, while still allowing the base station 102 (or other nodes) to schedule or request additional link reversal phases 204, e.g., on demand or more frequently. Delay periods between signaling and implementing the link reversal phase 204 may allow time for the nodes 102, 104, 106, 108 to prepare for the link reversal phase 204. Signaling mechanisms for scheduling a link reversal phase 204 may include, for example, a flag or field at the beginning of a super-frame which indicates which, if any, of the frames included in the super-frame may be reversed during a link reversal phase 204, or a flag or pointer in a previous frame could indicate a link reversal phase 204 for a frame.

The coherence time Tc may be determined during either the normal operation phase 202 or during the link reversal phase 204, and may be updated periodically, such as during every cycle of a normal operation phase 202 and link reversal phase 204, every third cycle, every tenth cycle, etcetera. Updating the coherence time Tc may allow the duration of the normal operation phase 202 to remain less than the coherence time Tc, which may allow the channel response of transmitted signals to remain essentially invariant.

Changes in the frequency response of one frequency may be correlated with changes in the frequency response of the other frequency. Thus, an infrastructure node 102, 104, 106 may schedule a link reversal phase 204 to correct a change in frequency response in a channel associated with the second frequency f2 based on detecting a change in the frequency response in a channel associated with the first frequency f1

For example, one or more of the infrastructure nodes 102, 104, 106 may determine, based on signals received from another infrastructure node 102, 104, 106 via the first frequency f1 during either the normal operation phase 202 or the link reversal phase 204, that a frequency response for a channel associated with the frequency has changed. The infrastructure node 102, 104, 106 may send a message to one or more infrastructure nodes 102, 104, 106 to schedule a link reversal phase 204, such as to determine the new frequency response. The infrastructure node 102, 104, 106 may perform the link reversal as scheduled, and determine a frequency response of a wireless channel associated with the second frequency f2 based on data received via the second frequency f2 from the infrastructure node 102, 104, 106 during the scheduled link reversal. The infrastructure node 102, 104, 106 may perform precoding on data based on the determined frequency response, and may transmit the precoded data to the infrastructure node 102, 104, 106 via the second frequency f2 during a normal operation phase 202.

Figure 3A:
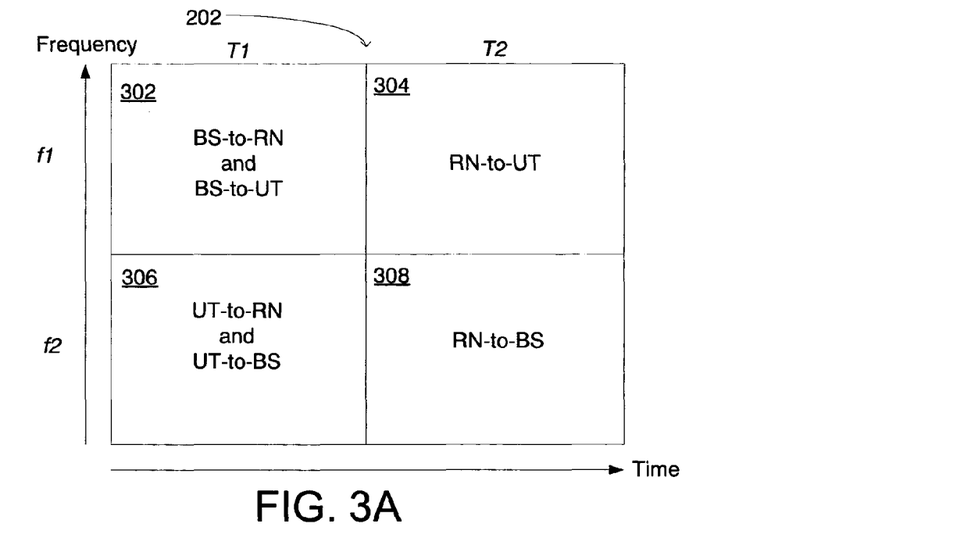
FIG. 3A is a block diagram showing directions of transmission for particular time slots and frequencies during the normal operation phase.

FIG. 3A is a block diagram showing directions of transmission for particular time slots and frequencies during the normal operation phase 202. In an example embodiment, the first frequency f1 may be used for communication in the first or downlink direction during the normal operation phase 202, such as from the base station 102 to the relay nodes 204, 206, from the base station 102 to the user terminal 108, and/or from the relay node 104 to the user terminal 108. According to this example, the second frequency f2 may be used for communication in the second or uplink direction during the normal operation phase 202, such as from the user terminal 108 to the relay node 104, from the user terminal 108 to the base station 102, and/or from the relay nodes 104, 106 to the base station 102.

According to an example embodiment, a wireless node 102, 104, 106, 108 may not typically transmit and receive using the same frequency at the same time. To allow for both transmission and reception by each wireless node 102, 104, 106, 108, the normal operation phase 202 may include two or more time slots which the wireless nodes may use for transmission and reception.

In the example shown in FIG. 3A, during a first time slot T1, the base station 102 may transmit or communicate to the relay nodes 104, 106 or the user terminal 108 in the first or downlink direction using the first frequency f1, as shown in block 302. Also during the first time slot T1, the user terminal 108 may transmit or communicate to the relay node 104 or the base station 102 in the second or uplink direction using the second frequency f2, as shown in block 306.

During a second time slot T2, the relay node 104 may transmit or communicate to the user terminal 108 in the first or downlink direction using the first frequency f1, as shown in block 304. Also during the second time slot T2, the relay nodes 104, 106 may transmit or communicate to the base station 102 in the second or uplink direction using the second frequency f2, as shown in block 308.

Figure 3B:
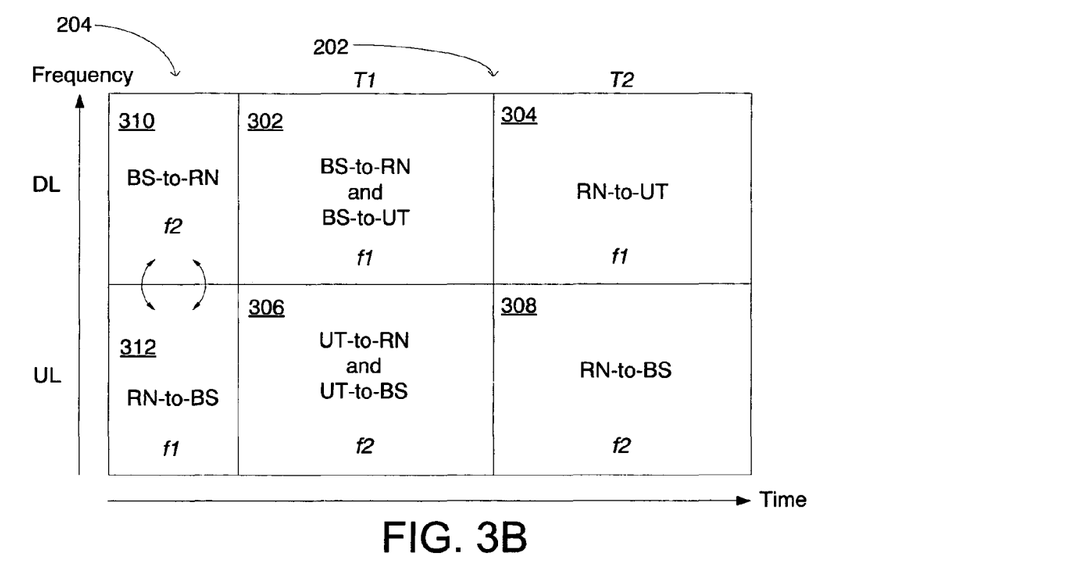
FIG. 3B is a block diagram showing directions of transmission for particular time slots and frequencies during both the link reversal phase and the normal operation phase.

FIG. 3B is a block diagram showing directions of transmission for particular time slots and frequencies during both the link reversal phase 204 and the normal operation phase 202. In this example, the operations performed during the normal operation phase 202 may be similar to the operations performed during the normal phase 202 in the example shown in FIG. 3A.

In the example shown in FIG. 3B, the base station 102 and the relay nodes 104, 106 may transmit or communicate to each other at the same time using different frequencies during the link reversal phase 204. The frequencies for communicating in each direction may be reversed from the frequencies used during the normal operation phase. For example, the base station 102 may transmit or communicate to the relay nodes 104, 106 in the first or downlink direction using the second frequency f2 during the link reversal phase 204, as shown in block 310. Also during the link reversal phase 204, the relay nodes 104, 106 may transmit or communicate to the base station 102 in the second or uplink direction using the first frequency f1, as shown in block 312. The infrastructure nodes 102, 104, 106 may cease communicating with the user terminal 108 during the link reversal phase 204, according to an example embodiment.

Figure 4:
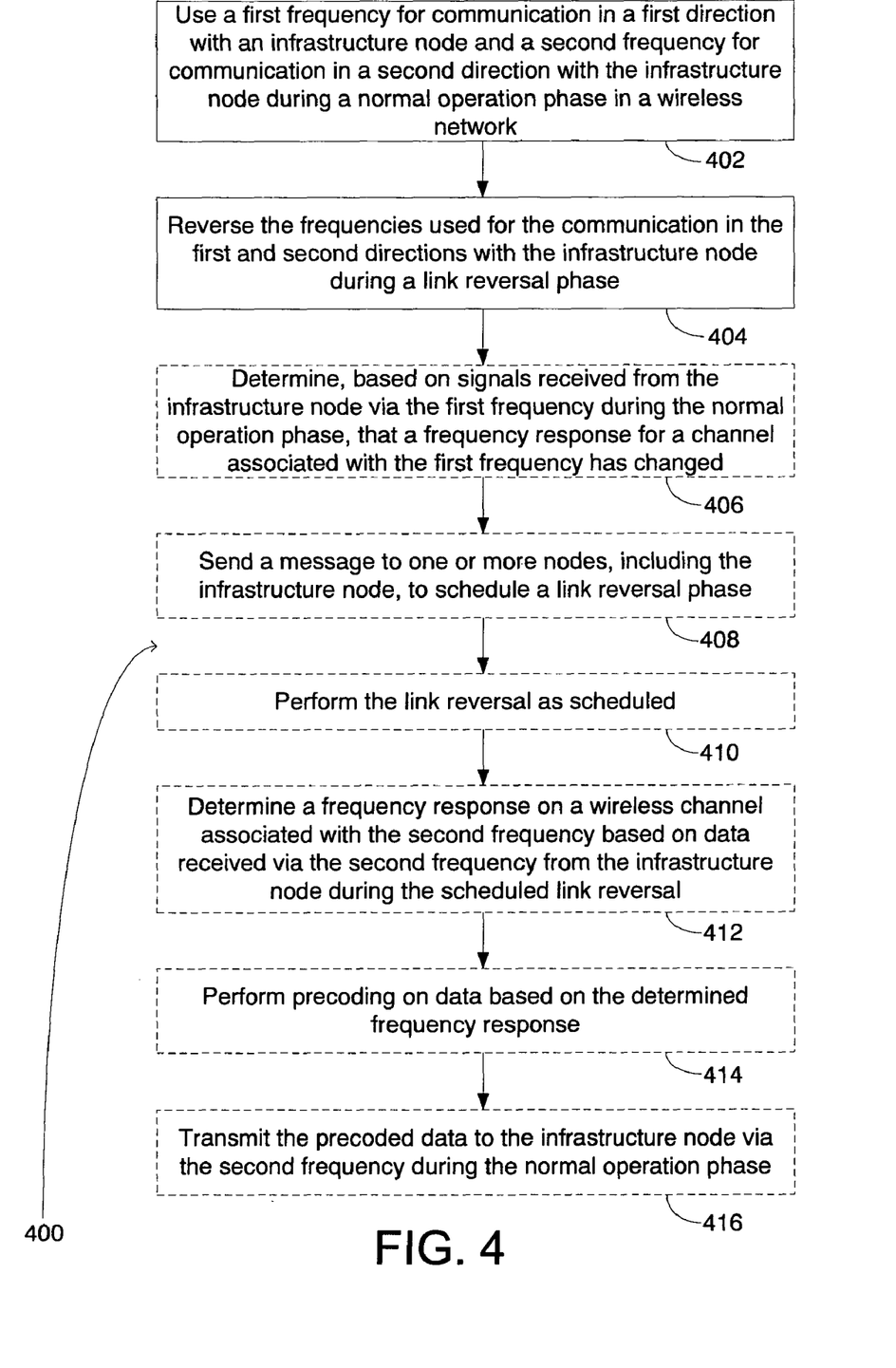
FIG. 4 is a flowchart showing a method according to an example embodiment.

FIG. 4 is a flowchart showing a method 400 according to an example embodiment. According to this example, the method 400 may include using a first frequency f1 for communication in a first direction with an infrastructure node 102, 104, 106 and a second frequency f2 for communication in a second direction with the infrastructure node 102, 104, 106 during a normal operation phase 202 in a wireless network 100 (402).

The method 400 may also include reversing the frequencies used for the communication in the first and second directions with the infrastructure node 102, 104, 106 during a link reversal phase 204 (404). The reversing may include using the first frequency for communication in the second direction and the second frequency for communication in the first direction with the infrastructure node 102, 104, 106 during the link reversal phase 204. Or, the reversing may include using the first frequency for downlink communication and the second frequency for uplink communication with the infrastructure node 102, 104, 106 during the link reversal phase 204. The link reversal phase may be performed in response to one or more of the following: a scheduled link reversal phase; a request from one or more nodes, including the infrastructure node, to perform the link reversal; and determining that a link reversal should be performed based on a changed channel condition or changed frequency response for one or more wireless channels or frequencies, as examples.

According to one example, the using (402) may include using the first frequency f1 for uplink communication to the infrastructure node 102, 104, 106 and the second frequency f2 for downlink communication from the infrastructure node 102, 104, 106 during the normal operation phase 202. In this example, the reversing may include reversing the frequencies used for uplink and downlink communication with the infrastructure node 102, 104, 106 during the link reversal phase 204.

According the another example, the using (402) may include using the first frequency f1 for uplink communication from the infrastructure node 102, 104, 106 and the second frequency f2 for downlink communication to the infrastructure node 102, 104, 106 during the normal operation phase 202. In this example, the reversing may include reversing the frequencies used for the uplink and downlink communication with the infrastructure node 102, 104, 106 during the link reversal phase 204.

According to another example, the using (402) may include using a first group of frequencies or subcarriers for uplink communication to the infrastructure node 102, 104, 106 and a second group of frequencies or subcarriers for downlink communication from the infrastructure node 102, 104, 106 during the normal operation phase 202. In this example, reversing the frequencies (404) may include reversing the groups of frequencies or subcarriers for the uplink and downlink communication with the infrastructure node 102, 104, 106 during the link reversal phase 204.

According to another example embodiment, the using (402) may include using a first group of frequencies or subcarriers for downlink communication from the infrastructure node 102, 104, 106 and a second group of frequencies or subcarriers for uplink communication to the infrastructure node 102, 104, 106 during the normal operation phase 202. In this example, reversing the frequencies (404) may include reversing the groups of frequencies or subcarriers used for the uplink and downlink communication with the infrastructure node 102, 104, 106 during the link reversal phase 204.

According to another example embodiment, the using the first frequency f1 for communication in the first direction with the infrastructure node 102, 104, 106 and the second frequency f2 for communication in the second direction with the infrastructure node 102, 104, 106 during the normal operation phase 202 may include using the first frequency f1 to receive from a base station 102 and the second frequency f2 to transmit to the base station 102 during the normal operation phase 202. In this example, reversing the frequencies during the link reversal phase 204 includes using the first frequency f1 to transmit to the base station 102 and the second frequency f2 to receive from the base station 102 during the link reversal phase 204.

According to another example embodiment, the using the first frequency f1 for communication in the first direction with the infrastructure node 102, 104, 106 and the second frequency f2 for communication in the second direction with the infrastructure node 102, 104, 106 during the normal operation phase 202 may include using the first frequency f1 to transmit to a relay node 104 and the second frequency f2 to receive from the relay node 104 during the normal operation phase 202. In this example, reversing the frequencies during the link reversal phase 204 includes using the first frequency f1 to receive from the relay node 104 and the second frequency f2 to transmit to the relay node 104 during the link reversal phase 204.

According to another example, although not shown in FIG. 4, the method 400 may also include using the first frequency f1 for communication in the first direction with a user terminal 108 and the second frequency f2 for communication in the second direction with the user terminal 108 during the normal operation phase 202. In this example, the method 400 may also include ceasing communication with the user terminal 108 during the link reversal phase 204, or the user terminal ceasing transmission during the link reversal phase 204.

According to another example, although not shown in FIG. 4, the method 400 may also include receiving signals from the infrastructure node 102, 104, 106 via the first frequency f1 during the link reversal phase 204. In this example, the method 400 may also include determining a frequency response of a wireless channel associated with the first frequency f1. The method 400 may also include performing precoding on data based on the determined frequency response, and transmitting the precoded data to the infrastructure node 102, 104, 106 via the first frequency f1 during the normal operation phase 202.

According to another example, the method 400 may also include receiving a request from the infrastructure node 102, 104, 106 to perform the link reversal phase 204, and scheduling the link reversal phase 204 based on the request.

According to another example, the method 400 may also include sending a message to a plurality of nodes, including the infrastructure node 102, 104, 106, indicating a schedule for the link reversal phase 204, and performing the link reversal phase 204 at one or more scheduled times based on the schedule.

According to another example, the method 400 may also include determining, based on signals received from the infrastructure node 102, 104, 106 via the first frequency f1 during the normal operation phase 202, that a frequency response for a channel associated with the first frequency f1 has changed (406). In this example, the method 400 may also include sending a message to one or more nodes, including the infrastructure node 102, 104, 106, to schedule a link reversal phase 204 (408). The method 400 may also include performing the link reversal as scheduled (410).

In this example, the method 400 may also include determining a frequency response on a wireless channel associated with the second frequency f2 based on data received via the second frequency f2 from the infrastructure node 102, 104, 106 during the scheduled link reversal (412). The method may also include performing precoding on data based on the determined frequency response (414), and transmitting the precoded data to the infrastructure node 102, 104, 106 via the second frequency f2 during the normal operation phase 202 (416).

Figure 5:
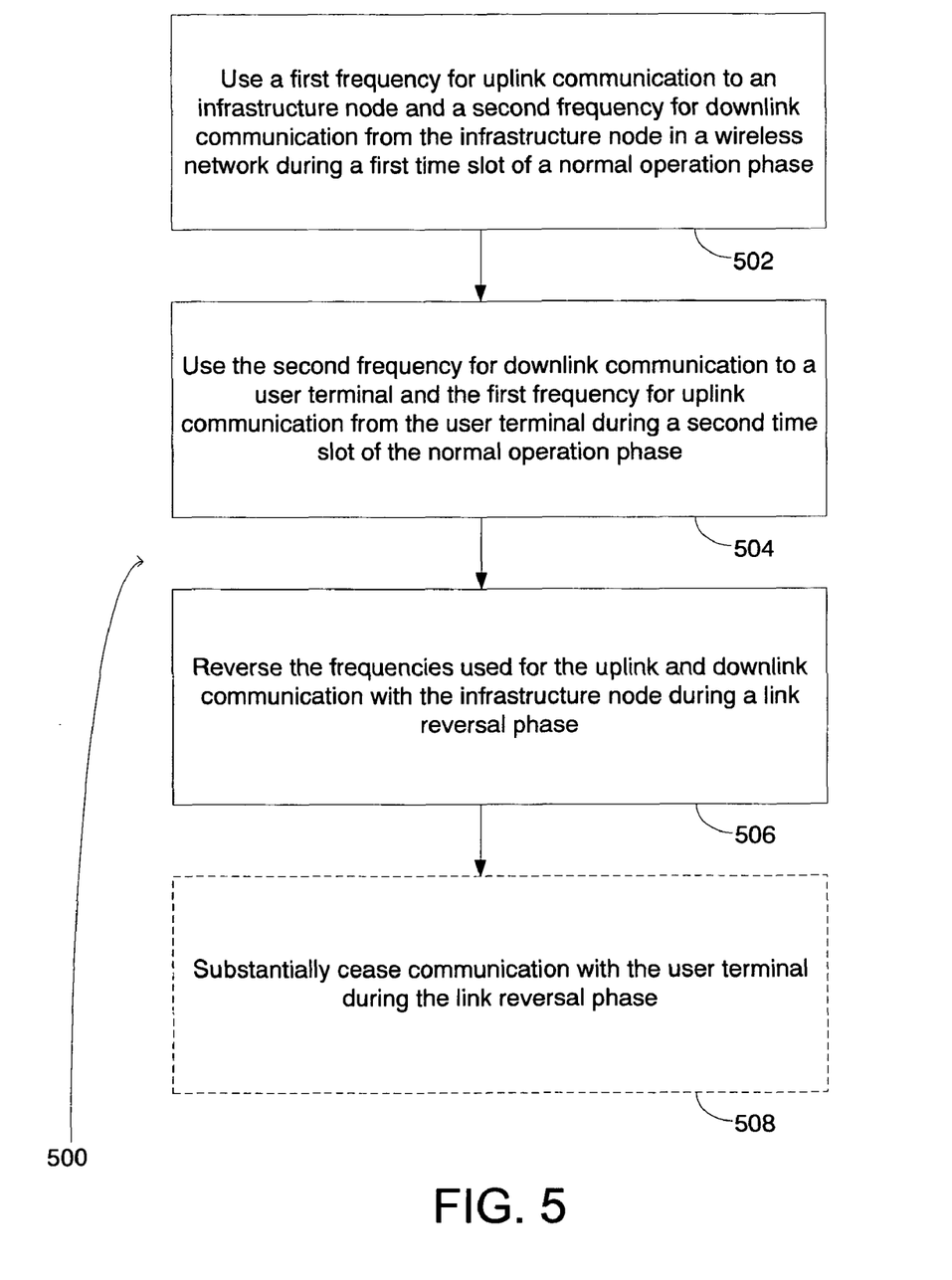
FIG. 5 is a flowchart showing a method according to another example embodiment.

FIG. 5 is a flowchart showing a method 500 according to another example embodiment. In this example, the method 500 may include using a first frequency f1 for uplink communication to an infrastructure node 102, 104, 106 and a second frequency f2 for downlink communication from the infrastructure node 102, 104, 106 in a wireless network 100 during a first time slot T1 of a normal operation phase 202 (502). The method 500 may also include using the second frequency f2 for downlink communication to a user terminal 108 and the first frequency for uplink communication from the user terminal 108 during a second time slot T2 of the normal operation phase 202 (504). The method 500 may also include reversing the frequencies used for the uplink and downlink communication with the infrastructure node 102, 104, 106 during a link reversal phase 204 (506). The reversing may include using the first frequency f1 for downlink communication and the second frequency f2 for uplink communication with the infrastructure node 102, 104, 106 during the link reversal phase 204.

In an example embodiment, the using may include using a first group of frequencies or subcarriers for uplink communication to the infrastructure node 102, 104, 106 and a second group of frequencies or subcarriers for downlink communication from the infrastructure node 102, 104, 106 during the normal operation phase 202. In this example, reversing the frequencies may include reversing the groups of frequencies or subcarriers used for the uplink and downlink communication with the infrastructure node 102, 104, 106 during the link reversal phase 204.

In another example embodiment, the method 500 may further include substantially ceasing communication with the user terminal 108 during the link reversal phase 204 (508), and/or the user terminal ceasing to transmit during the link reversal phase.

Figure 6:
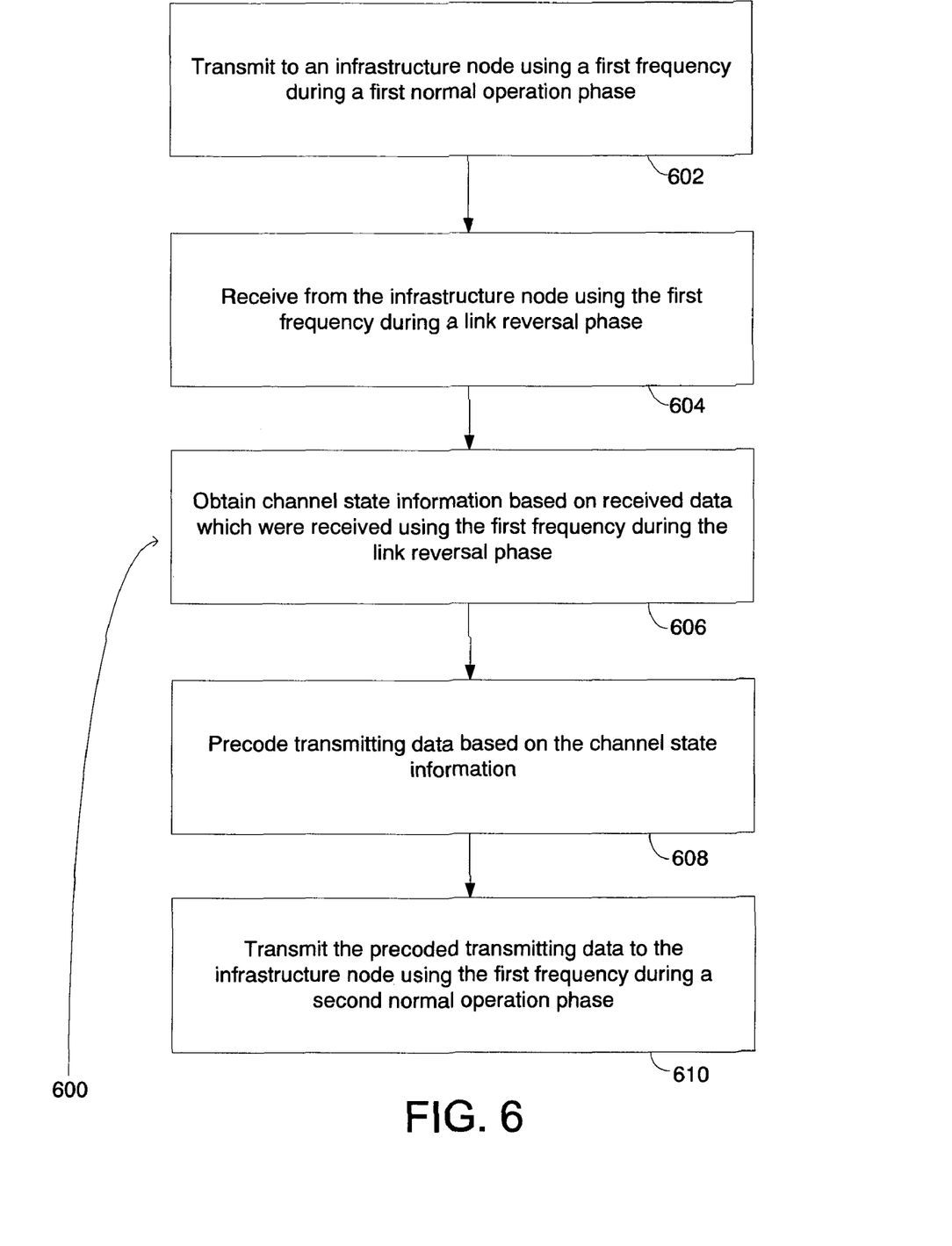
FIG. 6 is a flowchart showing a method according to another example embodiment.

FIG. 6 is a flowchart showing a method 600 according to another example embodiment. In this example, the method 600 may include transmitting to an infrastructure node 102, 104, 106 using a first frequency f1 during a first normal operation phase 202a (602). The method 600 may also include receiving from the infrastructure node 102, 104, 106 using the first frequency f1 during a link reversal phase 204 (604). The method 600 may also include obtaining channel state information based on received data which were received using the first frequency f1 during the link reversal phase 204 (606). The method 600 may also include precoding transmitting data based on the channel state information (608), and transmitting the precoded transmitting data to the infrastructure node 102, 104, 106 using the first frequency f1 during a second normal operation phase 202b (610).

Figure 7:
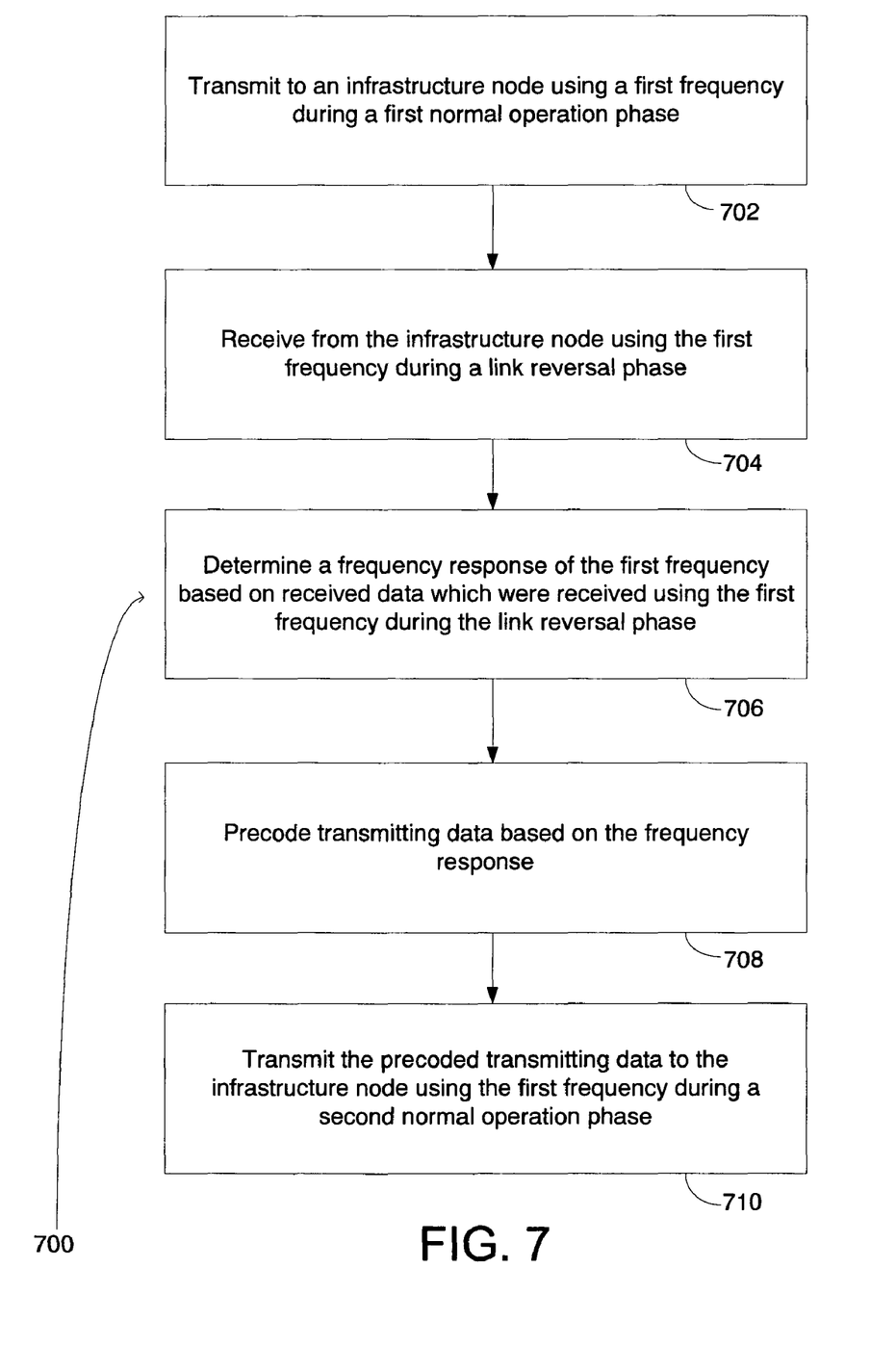
FIG. 7 is a flowchart showing a method according to another example embodiment.

FIG. 7 is a flowchart showing a method 700 according to another example embodiment. In this example, the method 700 may include transmitting to an infrastructure node 102, 104, 106 using a first frequency f1 during a first normal operation phase 202a (702). The method 700 may also include receiving from the infrastructure node 102, 104, 106 using the first frequency f1 during a link reversal phase 204 (704). The method 700 may also include determining a frequency response of the first frequency f1 based on received data which were received using the first frequency f1 during the link reversal phase 204 (706). In this example, the method 700 may include precoding transmitting data based on the frequency response (708), and transmitting the precoded transmitting data to the infrastructure node 102, 104, 106 using the first frequency f1 during a second normal operation phase 202b (710).

In another example embodiment, a method may include an access gateway (or base station or access point) receiving signals from a relay node using a first frequency during a first phase (or a link reversal phase). The access gateway may obtain or determine channel state information and/or determine a channel response for a wireless channel associated with the first frequency (e.g., for the channel between the access gateway and the relay node using the first frequency) based on the signals received at the access gateway from the relay node during the first phase. The method may also include the access gateway transmitting signals to the relay node using the first frequency during a second phase (or normal operation phase). The method may also include the access gateway precoding data for transmission to the relay node based on the determined channel state information and/or channel response for the channel associated with the first frequency, and transmitting the precoded data to the relay node using the first frequency during a second phase or normal operation phase.

As yet another example embodiment, a method may include a first relay node receiving signals from a second relay node using a first frequency during a first phase (or a link reversal phase). The first relay node may obtain or determine channel state information and/or determine a channel response for a wireless channel associated with the first frequency (e.g., for the channel between the first and second relay nodes using the first frequency) based on the signals received at the first relay node from the second relay node during the first phase. The method may also include the first relay node transmitting signals to the second relay node using the first frequency during a second phase (or normal operation phase). The method may also include the first relay node precoding data for transmission to the second relay node based on the determined channel state information and/or channel response for the channel associated with the first frequency, and transmitting the precoded data to the second relay node using the first frequency during a second phase or normal operation phase.

Figure 9A:
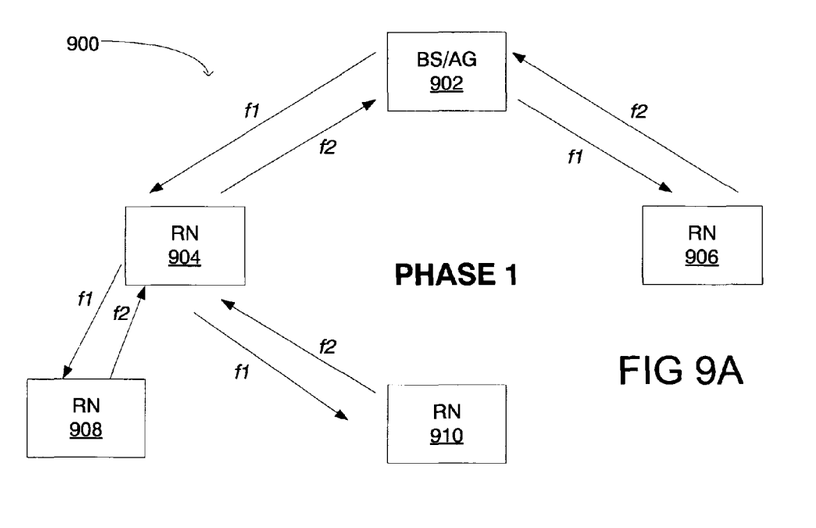
FIG. 9A is a diagram illustrating operation of a wireless network during a first phase according to an example embodiment.
Figure 9B:
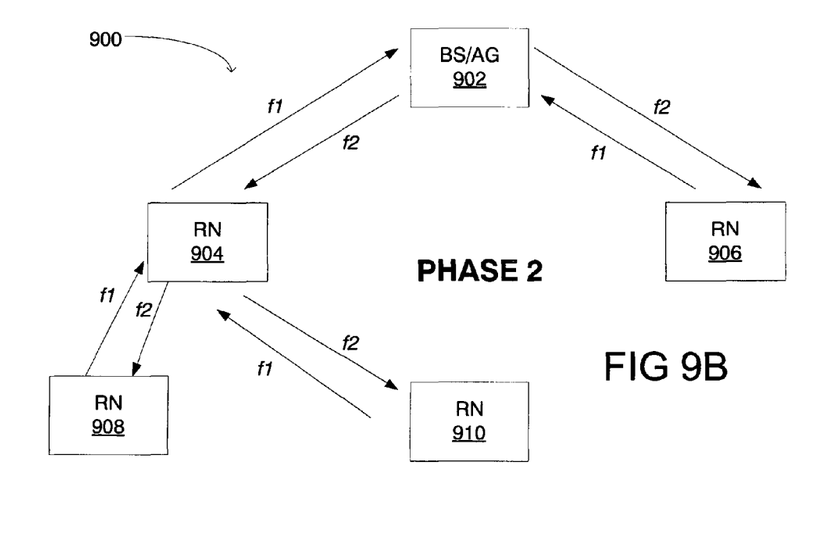
FIG. 9B is a diagram illustrating operation of a wireless network during a second phase according to an example embodiment.

FIG. 9A is a diagram illustrating operation of a wireless network during a first phase according to an example embodiment. FIG. 9B is a diagram illustrating operation of a wireless network during a second phase according to an example embodiment. The wireless network 900 illustrated in FIGS. 9A and 9B may be a mesh network, a relay network, or an access network. One or more user terminals or mobile nodes (not shown) may be associated or communicating with the relay nodes, for example. A base station/access gateway 902 (at a first level) may be coupled via wireless channel(s) to relay nodes 904 and 906 (a second level of nodes). Relay nodes 908 and 910 may be coupled via wireless channel(s) to relay nodes 908 and 910 (a third level of nodes).

For example, two frequency bands f1 and f2 may be used by each element or node, one for transmitting and the other for receiving. In addition to this basic FDD (frequency division duplexing) mechanism, each network element or node may be able to switch the bands used between transmission and reception in a periodic manner, e.g. every radio frame. This may result in a 2-phase organization of the system. In the example 3 tiers or levels of nodes are shown: AG 902 on the first tier, connected to 2 RNs (904, 906) on the second tier or level, with RN 904 of them coupled to 2 RNs (908, 910) on the third tier. f1 and f2 may indicate the two used frequency bands. In a first phase (phase 1, FIG. 9A), AG 902 may transmit on f1 to the RNs of the second tier (904, 906), while receiving in f2 from nodes 904, 906. At the same time, the RNs on the $2^{nd}$ tier (RNs 904, 906) will transmit via f2 to the RNs (908, 910) on the $3^{rd}$ tier, receiving in f1 from the third tier RNs. During the second phase (phase 2), all the frequency bands are swapped (or reversed or switched), so that one element or node that was transmitting on f1 during the first phase (phase 1) will now transmit in f2 during phase 2 (or second phase), and that nodes or elements that transmitted on f2 during the first phase (phase 1) will now transmit on f1 during phase 2.

Consider, for example, an RN 904 on the second tier. The RN received the signal transmitted by the AG 902 on f1 during the 1$^{st}$ phase, and it will transmit a signal to the AG 902 on f1 during the 2$^{nd}$ phase. At this point, the RN 904 may take advantage of the channel knowledge (e.g., channel state information, channel response or other channel information) acquired while receiving in the previous phase, which may the RN 904 to use a better link adaptation strategy and if it is equipped with multiple antennas, a suitable beamforming scheme, and also precoding, or other techniques to improve performance.

Similarly, the AG 902 may receive signals on f1 from RN 904 (and RN 906) during the phase 2 and may exploit the channel reciprocity to perform multi-user precoding in downlink direction on f1 during phase 1 (e.g., based on channel state information obtained during phase 2 for frequency f1), and thereby improving the throughput of the system.

The network illustrated in FIGS. 9A and 9B may use paired frequency bands for transmission/reception, as shown. The frequency bands may be switched or reversed at specified intervals, or at times on demand or request of the AG or other relay node, for example. The switching or reversal of frequencies may be, for example, periodic or at scheduled intervals. The periodicity (or interval between reversal of bands) may be flexible, depending on the condition of the radio environment, and may be a configuration parameter, which dictates a periodicity of X-frames (band reversal every X-frames), where X may be configured, and then communicated by AG 902 to the RNs, for example. The AG 902 may signal a new value of X. Or X may be a parameter configured for the system or network. The period or interval (e.g., X) may be specified locally for different portions of the network, for example. This may allow a node that is experiencing heaving interference in one band but low interference in the other to possibly request or specify a different period or intervals for use of bands f1 and f2, thereby allowing it to request a greater usage of the band where it experiences lower interference, while still allowing it to obtain channel state information during the reversed state. Or the switching between frequency bands may be integrated into an interference coordination strategy, e.g., bands may be switched using random time intervals, as an example.

Figure 8:
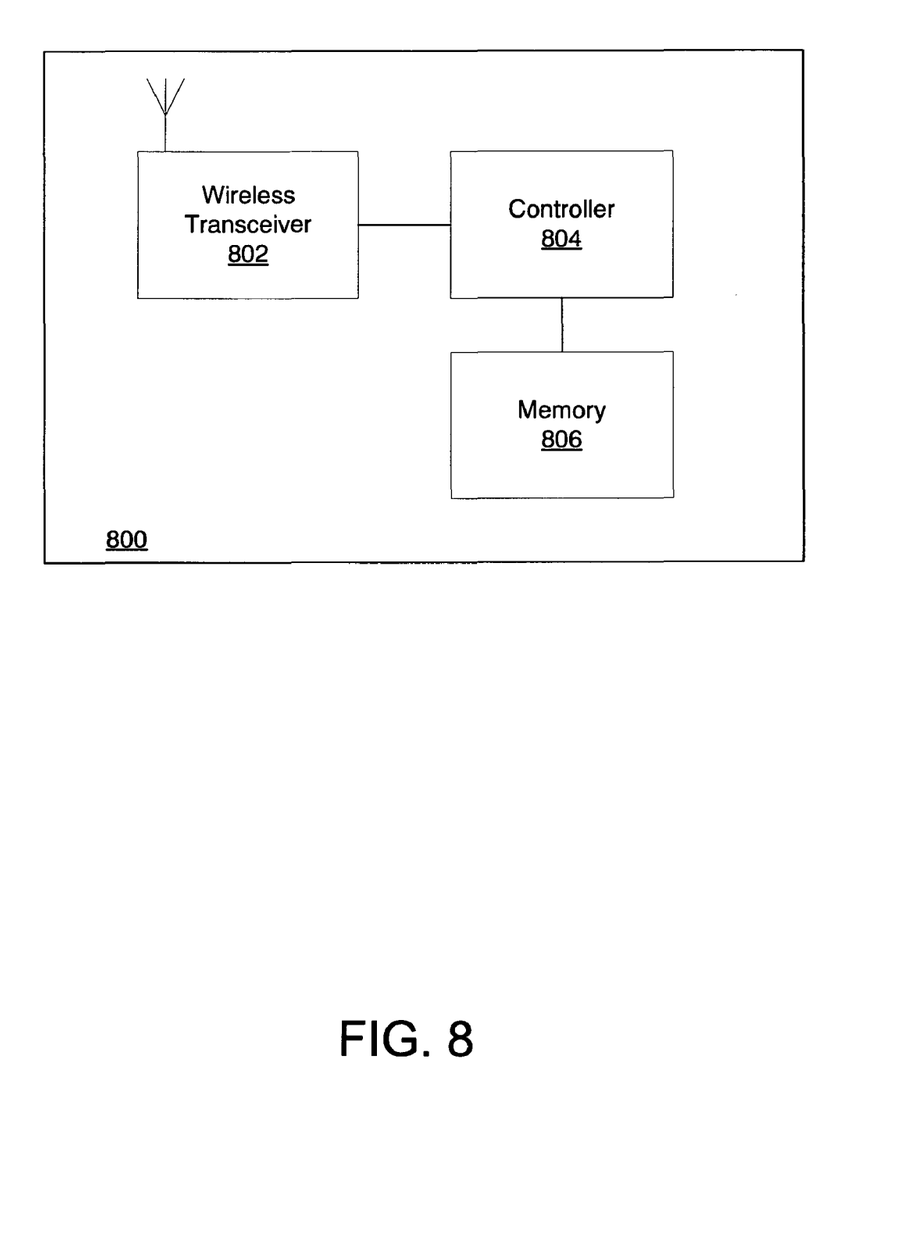
FIG. 8 is a block diagram showing an apparatus according to an example embodiment.

FIG. 8 is a block diagram showing an apparatus 800 according to an example embodiment. The apparatus 800 may include an infrastructure node such as a base station 102 or relay node 104, 106, according to an example embodiment.

The apparatus 800 may be configured to use a first frequency f1 for communication in a first direction with an infrastructure node 102, 104, 106 and a second frequency f1 for communication in a second direction with the infrastructure node 102, 104, 106 during a normal operation phase 202 in a wireless network 100, according to an example embodiment. Also according to this example, the apparatus 800 may be configured to reverse the frequencies used for the communication in the first and second directions with the infrastructure node 102, 104, 106 during a link reversal phase 204.

In another example, the apparatus 800 may include a wireless transceiver 802, a controller 804, and a memory 806. The transceiver 802 may be configured, for example, to use a first frequency f1 for communication in a first direction with an infrastructure node 102, 104, 106 and a second frequency f2 for communication in a second direction with the infrastructure node 102, 104, 106 during a normal operation phase 202 in a wireless network 100. The transceiver may be further configured to reverse the frequencies used for the communication in the first and second directions with the infrastructure node 102, 104, 106 during a link reversal phase 204.

The controller 804 may, for example, be configured to determine a frequency response of a wireless channel associated with the first frequency f1 based on a signal received during the link reversal phase 20, precode data based on the frequency response, and instruct the transceiver 802 to transmit the precoded data in the first direction using the first frequency f1.

The memory 806 may be configured to store the frequency response, the channel state information, or information describing the frequency or channel response or the channel state information.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A method comprising:
   using a first frequency for communication in a first direction from an infrastructure node for a relay node and a second frequency for communication in a second direction towards the infrastructure node during a normal operation phase in a wireless network; and
   reversing the frequencies used for the communication in the first and second directions with the infrastructure node during a link reversal phase.

2. The method of claim 1, wherein the reversing comprises using the first frequency for communication in the second direction and the second frequency for communication in the first direction with the infrastructure node during the link reversal phase.

3. The method of claim 1, wherein the reversing comprises using the first frequency for downlink communication and the second frequency for uplink communication with the infrastructure node during the link reversal phase.

4. The method of claim 1 wherein:
   said using comprises using the first frequency for uplink communication to the infrastructure node and the second frequency for downlink communication from the infrastructure node during the normal operation phase; and
   said reversing comprises reversing the frequencies used for the uplink and downlink communication with the infrastructure node during the link reversal phase.

5. The method of claim 1, further comprising:
   using the first frequency for communication in the first direction with a user terminal and the second frequency for communication in the second direction with the user terminal during a normal operation phase; and
   ceasing communication with the user terminal during the link reversal phase.

6. The method of claim 1, wherein:
   the using comprises using a first group of frequencies or subcarriers for uplink communication to an infrastructure node and a second group of frequencies or subcarriers for downlink communication from the infrastructure node during the normal operation phase;
   reversing the frequencies comprises reversing the groups of frequencies or subcarriers used for the uplink and downlink communication with the infrastructure node during the link reversal phase.

7. The method of claim 1, further comprising:
   receiving signals from the infrastructure node via the first frequency during the link reversal phase;
   determining a frequency response of a wireless channel associated with the first frequency;
   performing precoding on data based on the determined frequency response; and
   transmitting the precoded data to the infrastructure node via the first frequency during the normal operation phase.

8. The method of claim 1, further comprising:
   receiving a request from the infrastructure node to perform a link reversal phase; and
   scheduling the link reversal phase based on the request.

9. The method of claim 1, further comprising:
   sending a message to a plurality of nodes, including the infrastructure node, indicating a schedule for a link reversal phase; and
   performing the link reversal phase at one or more scheduled times based on the schedule.

10. The method of claim 1, further comprising:
    determining, based on signals received from the infrastructure node via the first frequency during a normal operation phase, that a frequency response for a channel associated with the first frequency has changed;
    sending a message to one or more nodes, including the infrastructure node, to schedule a link reversal phase;
    performing the link reversal as scheduled;
    determining a frequency response of a wireless channel associated with the second frequency based on data received via the second frequency from the infrastructure node during the scheduled link reversal; and
    performing precoding on data based on the determined frequency response; and transmitting the precoded data to the infrastructure node via the second frequency during a normal operation phase.

11. The method of claim 1, wherein the precoded data is transmitted to a plurality of infrastructure nodes via the second frequency during a normal operation phase.

12. The method of claim 1, wherein the link reversal phase is performed in response to at least one of the following:
    a scheduled link reversal phase;
    a request from at least one node, including the infrastructure node, to perform the link reversal; and
    determining that a link reversal should be performed based on a changed channel condition or changed frequency response for at least one wireless channels or frequencies.

13. The method of claim 1, wherein:
    using the first frequency for communication in the first direction with the infrastructure node and the second frequency for communication in the second direction with the infrastructure node during the normal operation phase comprises using the first frequency to receive from a base station and the second frequency to transmit to the base station during the normal operation phase; and
    reversing the frequencies during the link reversal phase comprises using the first frequency to transmit to the base station and the second frequency to receive from the base station during the link reversal phase.

14. The method of claim 1, further comprising:
    receiving from the infrastructure node using the first frequency during a link reversal phase;
    obtaining channel state information based on received data which were received using the first frequency during the link reversal phase;

precoding transmitting data based on the channel state information; and transmitting the precoded transmitting data to the infrastructure node using the first frequency during a second normal operation phase.

15. A method of claim 1, wherein the using comprises:

using a first frequency for uplink communication to an infrastructure node and a second frequency for downlink communication from the infrastructure node in a wireless network during a first time slot of a normal operation phase;

using the second frequency for downlink communication to a user terminal and the first frequency for uplink communication from the user terminal during a second time slot of a normal operation phase; and reversing the frequencies used for the uplink and downlink communication with the infrastructure node during a link reversal phase.

16. An apparatus configured to:

use a first frequency for communication in a first direction from an infrastructure node for a relay node and a second frequency for communication in a second direction towards the infrastructure node during a normal operation phase in a wireless network; and reverse the frequencies used for the communication in the first and second directions with the infrastructure node during a link reversal phase.

17. An apparatus of claim 16, further comprising:

a controller configured to:

determine a frequency response of a wireless channel associated with the first frequency based on a signal received during the link reversal phase;

precode data based on the frequency response; and instruct the transceiver to transmit the precoded data in the first direction using the first frequency; and a memory configured to store the frequency response.

\* \* \* \* \*